United States Patent
M

(10) Patent No.: US 9,407,421 B2
(45) Date of Patent: *Aug. 2, 2016

(54) METHOD FOR ASSOCIATING AND CONSOLIDATING MME BEARER MANAGEMENT FUNCTIONS

(71) Applicant: Tejas Networks Limited, Bangalore, Karnataka (IN)

(72) Inventor: Vinod Kumar. M, Bangalore (IN)

(73) Assignee: Tejas Networks Limited, Bangalore, Karnataka (IN)

( * ) Notice: Subject to any disclaimer, the term of this patent is extended or adjusted under 35 U.S.C. 154(b) by 0 days.

This patent is subject to a terminal disclaimer.

(21) Appl. No.: 14/150,790

(22) Filed: Jan. 9, 2014

(65) Prior Publication Data

US 2014/0198714 A1 Jul. 17, 2014

(30) Foreign Application Priority Data

Jan. 15, 2013 (IN) .............................. 187/CHE/2013

(51) Int. Cl.
*H04L 5/00* (2006.01)
*H04B 7/15* (2006.01)
*H04W 16/26* (2009.01)
*H04W 72/04* (2009.01)

(52) U.S. Cl.
CPC ............... *H04L 5/0091* (2013.01); *H04B 7/15* (2013.01); *H04W 16/26* (2013.01); *H04W 72/0406* (2013.01)

(58) Field of Classification Search
None
See application file for complete search history.

(56) References Cited

U.S. PATENT DOCUMENTS

| 2010/0260096 | A1* | 10/2010 | Ulupinar et al. | 370/315 |
| 2011/0111758 | A1* | 5/2011 | Liu et al. | 455/435.2 |
| 2012/0039299 | A1* | 2/2012 | Teyeb et al. | 370/331 |
| 2015/0092696 | A1* | 4/2015 | Liu et al. | 370/329 |

OTHER PUBLICATIONS

3GPP, 3GPP TR 36.806, Mar. 2010, 3GPP, V9.0.0, all pages.*

* cited by examiner

*Primary Examiner* — Chirag Shah
*Assistant Examiner* — Srinivasa Reddivalam
(74) *Attorney, Agent, or Firm* — Merchant & Gould P.C.

(57) ABSTRACT

An aspect of the invention provides for a method of managing bearer signaling for one or more user equipments (UEs) coupled to a eNodeB via at least one relay node, by generating and sending MME Association Consolidation (MAC) request message by the eNodeB to the plurality of disparate mobility management entities managing plurality of user equipments coupled to the said relay node based on receiving bearer resource request of at least one user equipment coupled to the said relay node. The method further comprising of making available to the MME of the said relay node, MME Association Consolidation (MAC) response from the said plurality of disparate mobility management entities managing plurality of user equipments coupled to the said relay node and provisioning by the MME of the said relay node the bearer resource request of at least an user equipment, based on the received MAC response, and provisioning the consequential bearer request of the said relay node wherein, provisioning includes creating, updating, modifying and deleting bearers of UE and RN.

9 Claims, 4 Drawing Sheets

METHOD FOR ASSOCIATING AND CONSOLIDATING MME BEARER MANAGEMENT FUNCTIONS

REFERENCE TO PRIORITY APPLICATION

This application claims priority from Indian Non-provisional Application Serial No. 187/CHE/2013 filed Jan. 15, 2013, entitled "METHOD FOR ASSOCIATING AND CONSOLIDATING MME BEARER MANAGEMENT FUNCTIONS", which is incorporated herein by reference in its entirety.

FIELD OF THE INVENTION

The present disclosure relates to bearer management in a wireless communication network. In particular, the invention relates to association and consolidation of mobility management entity functions with respect to bearer establishment of user equipments and relay node in a wireless communication network.

BACKGROUND

Wireless network technologies provide communication contents such as voice, video, packet data, messaging, broadcast, etc., which provide multiple-access systems capable of supporting multiple users by sharing the available system resources. In order to provide better qualities of service and wider communication ranges and coverage (accepted) between wireless nodes, the concept of relay station has been introduced in network systems. The purpose of deploying relay station or Relay Node (RN) in network system is to extend the serving coverage of base station and also increase traffic throughput; hence, user equipment (UE) which is not within the communication coverage of base station or has low signal strength can access the services provided by base station via relay node.

Wireless network architecture as defined by 3GPP introduces wireless relay node (RN) entity to extend the coverage of base station (eNB). A long term evolution-advanced (LTE-A) system, as its name implies, is an evolution of the 3GPP/LTE system, considering relaying for cost-effective throughput enhancement and coverage extension. For example, a relay can be deployed at the cell edge where the eNB is unable to provide required radio quality/throughput for the UEs or at certain location where radio signals of the eNB cannot cover.

The Relay Node (RN) forms an independent physical cell. From a user equipment (UE) perspective, the RN is seen as a usual base station. The RN is connected via a wireless link to the base station. The base station, to which the RN is connected, is called Donor-eNB (Donor eNB) and operates as a usual base station. The deployment of RN in the 3GPP network architecture is described in 3GPP Technical Specification 36.806; "Relay architectures for E-UTRA (LTE-Advanced)".

In order for the user equipment to receive a service from the network, it needs to establish connectivity via base station, by initiating Non-Access Stratum (NAS) signaling messages with network nodes like Mobility Management Entity (MME) that is managing or serving the UE. Consequential signaling messages are exchanged between network nodes to allocate bearer resources for UE and RN to service the UE request. The above bearer management procedure can be initiated by UE or the Evolved Packet Core (EPC in terms of 3GPP LTE) or simply the communication network. Similar procedures are followed for managing existing bearers. The managing functions include creating new entry, updating and deleting.

Whenever a UE bearer is created or modified, the RN bearer modify or create procedures may be initiated by the RN. This increases the exchange of messages separately for the UE and for the RN to modify/create a new bearer. Thus additional messages may be exchanged by the RN each time a bearer is created/modified for the UE, leading to delayed access service and as well as backhaul bandwidth is wasted or underutilized. Therefore, there is a need for a bearer management to optimize radio and non-radio (wired or fiber) backhaul resources by effectively setting-up the bearers.

SUMMARY OF THE INVENTION

The summary represents the simplified condensed version of the claimed subject matter and it is not an extensive disclosure of the claimed subject matter. The summary neither identifies key or critical elements nor delineates the scope of the claimed subject matter. The summary presents the simplified form of the claimed subject matter and acts as a prelude to the detailed description that is given below.

The present invention and its embodiments are made to provide for a feasible solution for facilitating bearer management in a communication network optimizing exchange of signaling communication in managing bearers for UE and RN by consolidation of mobility management entity functions with respect to bearer establishment of user equipment and relay node in a wireless communication network.

An aspect of the invention provides for a method of managing bearer signaling for one or more user equipments (UEs) coupled to a eNodeB via at least one relay node, by generating and sending MME Association Consolidation (MAC) request message by eNodeB to the plurality of disparate mobility management entities managing plurality of user equipments coupled to the said relay node based on receiving bearer resource request of at least one user equipment coupled to the said relay node. The method further comprising of making available to the MME of the said relay node, MME Association Consolidation (MAC) response from the said plurality of disparate mobility management entities managing plurality of user equipments coupled to the said relay node and provisioning by the MME of the said relay node the bearer setup request of at least an user equipment, based on the received MAC response, and provisioning the consequential bearer setup request of the said relay node.

Another aspect relates to respective network nodes like, eNodeB, MME facilitating the above method of managing bearers each comprising of means for communicating MME Association Consolidation (MAC) messages with other wireless communication network nodes; means for executing functions associated with 'MME Association Consolidation (MAC) messages' and provisioning bearers for UE based on the received 'MAC response' and provisioning the consequential bearer request of RN and a memory for storing information and retaining instructions for executing functions associated with the above MME Association Consolidation.

Other aspects, advantages, and salient features of the invention will become apparent to those skilled in the art from the following detailed description, which, taken in conjunction with the annexed drawings, discloses exemplary embodiments of the invention.

DESCRIPTION OF THE DRAWINGS

The features, advantages and other aspects of the embodiments of the present invention will be obvious to any person skilled in the art to appreciate the invention when read with the following description taken in conjunction with the accompanying drawings.

The figures are not drawn to scale and are illustrated for simplicity and clarity to help understand the various embodiments of the present invention. Throughout the drawings it should be noted that like reference numbers are used to depict the same or similar elements, features and structures.

DETAILED DESCRIPTION

Figure 1:
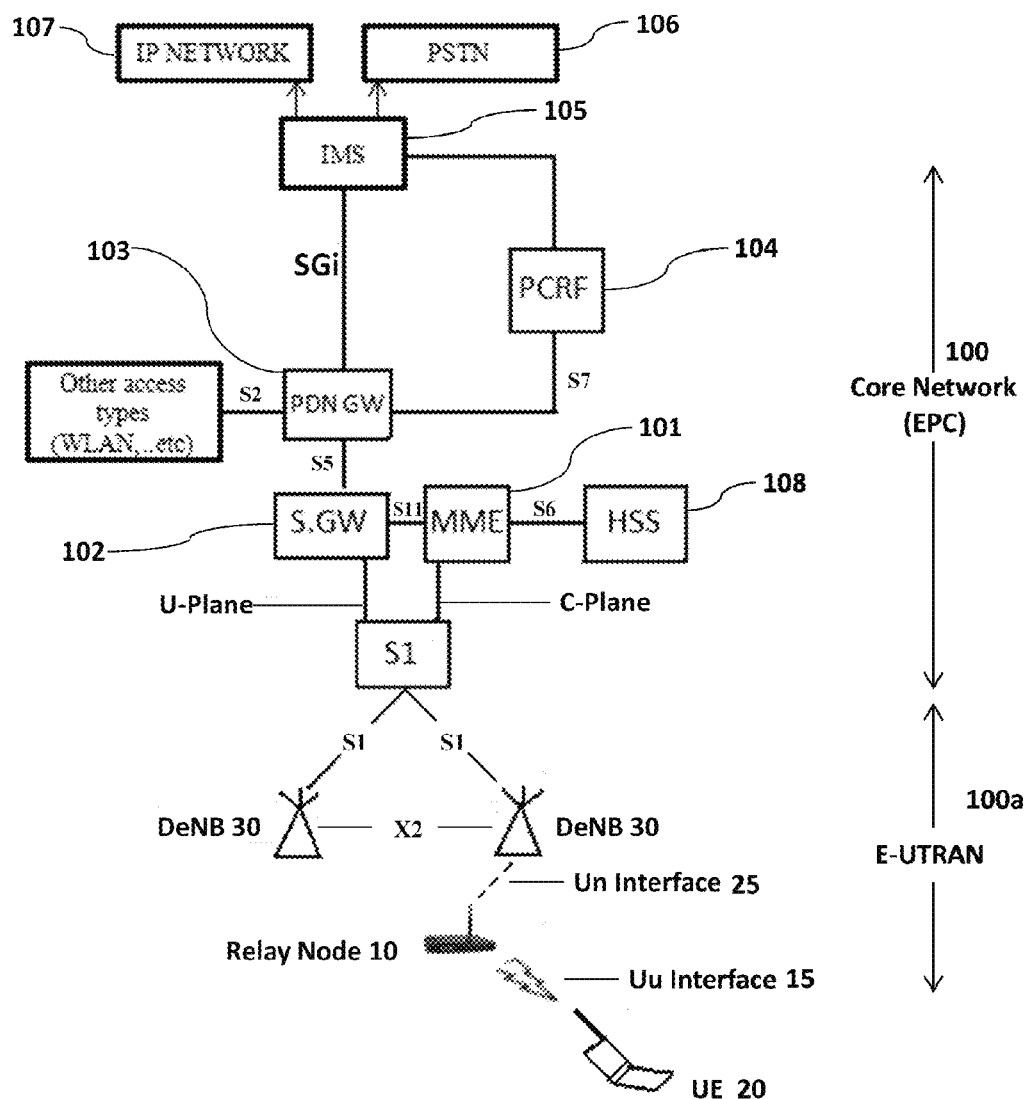
FIG. 1 illustrates a relay enhanced communication network as specified in 3GPP LTE network architecture.

The following descriptions with reference to the accompanying drawings are provided to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention and may be implemented in any suitably arranged systems. It should be understood that these are provided to merely aid the understanding of the description, and that their use and definitions in no way limit the scope of the invention.

The present invention and its embodiments are mainly described in relation to 3GPP specifications and standards (LTE-Advanced) for applicability of certain exemplary embodiments. The terminology used is therefore related thereto. Such terminology is used in the context of describing the embodiments of the invention and it does not limit the invention in any way. Any other network architecture or system deployment, etc., may also be utilized as long as it is compliant with the features described herein.

In particular, embodiments of the present invention may be applicable in any relay-enhanced (cellular) system with a need for signaling optimization. Embodiments of the present invention may be applicable for/in any kind of modern and future communication network including any mobile/wireless communication networks/systems.

The following paragraphs will describe various embodiments of the invention. For exemplary purposes only, most of the embodiments are outlined according to the LTE-Advanced mobile communication system with the solution to the problem discussed in the background. It should be noted that the invention may be advantageously used in connection with the communication system described above, but the invention is not limited to its use in this particular exemplary communication network. The explanations given below are intended to better understand specific exemplary embodiments described herein and should not be understood as limiting the invention to the specific implementations of processes and functions in a mobile communication network. The improvements/solutions proposed herein may be readily applied in architectures/systems having relevance to relay architectures. Some embodiments of the invention may also make use of standard and improved procedures of these architectures/systems.

The techniques described herein may be used for various wireless communication networks such as CDMA networks, CDMA implementing radio technology such as UTRA, TDMA networks, TDMA implementing radio technology such as GSM, FDMA networks, OFDMA networks, OFDDA implementing radio technology such as Evolved URTA (E-UTRA), SC-FDMA networks.

User equipment (UE) used in the following description denotes various terminologies used like an access terminal (AT), wireless communication device, terminal, subscriber station, wireless handset, computer or wireless module, wireless module for use with a computer, personal digital assistant (PDA), tablet computer or device.

In 3GPP LTE, a Base station may be referred to as evolved Node B or eNodeB. For the sake of simplicity and brevity in the following description the terms, donor eNB or eNodeB used generically to mean the functions performed by nodes referred to in the context of explaining functions associated with a 'Base station', Access Point, a Node B, an enhanced Node B, Base station, Evolved Node B, eNB, radio access stations (RASs), or Base Transceiver Stations (BTSs) and the like.

FIG. 1 represents an overall architecture of a communication network with a relay node (RN). A relay node 10 has a donor base station (Donor eNB) 30 and a terminal side called as user equipment (UE) 20. Towards UE 20 the RN 10 behaves as a conventional eNB using the access link 15 (Uu interface) and the UE 20 is not aware of whether it is communicating with a relay node 10 or a base station 30. Relay nodes are therefore transparent for the UE. Towards base stations relay nodes initially operate as a UE using the radio interface to connect to the base station. Once connection is established and the relay node is configured, the relay uses a subset of the UE functionality for communication on the backhaul link 25 (Un interface). In relay architecture as shown in the above figure, donor eNB 30 acts as a proxy between the core network 100 and the relay node 10. From the relay perspective, it appears as if RN 10 is directly connected to the core network 100 as the donor eNB appears as a mobility management entity (MME) for the S1 interface and a base station (eNB) for X2 interface towards the relay node 10. From the perspective of core network, the relay node appears as it belongs to the donor eNB.

Core network 100 and also other blocks (106, 107), show the relationship between them. The above diagram shows signaling interfaces. Interfaces like S1, S2 supports both user plane and control plane signaling, whereas interfaces like S6, S7 support only control plane signaling. The IMS (IP Multimedia Subsystem) 105 located on top of the blocks provide access to both private IP network 107 and PSTN (Public Switched Telephone Network) 106 via Media Gateway network entities. The HSS (Home Subscriber Server) 108 manages user subscription information and provides services to all Core Network (CN) 100 blocks of 3G and evolved 3G architecture.

The MME 101 is in charge of all the control plane functions related to subscriber and session management. Its responsibility includes connection/release of bearers to a terminal, handling of IDLE to ACTIVE transitions, and handling of security keys. The functionality operating between the UE and the Core Network is referred to as Non-Access Stratum (NAS), whereas Access Stratum (AS) handles functionality operating between the terminal and the radio access network. It supports security procedures, terminal-to-network session handling, and Idle terminal location management. The MME 101 is linked through the S6 interface to the HSS and is linked through the S1 interface to the donor eNB.

The Serving GW 102 is the termination point of the packet data interface towards donor eNB and UE through RN (E-UTRAN 100*a*). When UEs move across eNB in E-UTRAN 100*a*, Serving GW 102 serves as a local mobility anchor, meaning that packets are routed through this point for intra E-UTRAN mobility and mobility with other 3GPP technologies like 2G/GSM and 3G/UMTS. The Packet Data Network Gateway (PDN GW) 103 is similar to the Serving GW 102. The PDN GW is the termination point of the packet data interface towards Packet Data Network and also supports policy enforcement features as well as packet filtering (like deep packet inspection for virus signature detection) and evolved charging support (like per URL charging). Policy and Charging Rules Function (PCRF) 104 enforces policy features (which apply operator-defined rules for resource allocation and usage.

The UEs are connected to the RN by means of an Uu interface 15 and the RN to the Donor eNB by means of Un interface 25. Multiple base stations (eNBs) are normally interconnected with each other by means of the X2-Interface and to the Core Network by means of the S1 interface, more specifically to the MME (Mobility Management Entity) via the S1-MME, and to the Serving Gateway (S-GW) by means of the S1-U interface. The S1 interface supports a many-to-many relation between MMES/Serving Gateways and multiple base stations.

When the network e.g., MME 101 has no valid location or routing information for the UE 20, the UE 20 cannot be reached. This is more likely when the UE 20 is in a state of switched off, or out of coverage area. 3GPP LTE defines this state as a de-registered state and this could also happen when the UE is in non-3GPP access. When the UE 20 is attached to the network e.g., MME 101, it can receive Core Network 100 services. This state is defined by 3GPP as registered state. In this registered state the UE 20 can be in two different connection management states like RRC_IDLE state and RRC_CONNECTED state. When no data is being transmitted and the radio resources are released, the UE has a valid IP configuration. In such idle state there is no Non-Access Stratum (NAS) signaling connection between the UE and the network, e.g., MME 101. In the RRC_CONNECTED state, there is an active connection between the UE 20 and donor eNB 30, which implies a communication context being stored within the donor eNB 30 for this UE 20. Both sides can exchange user data and or signaling messages over logical channels.

From the wireless network perspective, protocol structure for the User and Control planes correspond to user data transmission and signaling transmission. Control plane corresponds to the information flows actually considered as signaling by E-UTRAN 100*a* and Core Network 100. This includes all the RRC (Radio Resource Control) E-UTRAN signaling (supporting functions such as Radio Bearer management, radio mobility, user paging) and NAS (Non Access Stratum) signaling. On the radio interface, the Control plane uses the Control plane protocol stack namely PDCP (Packet Data Convergence Protocol), RLC (Radio Link Control), MAC (Medium Access Control) and PHY (Physical) stack to transport both RRC and Core Network NAS signaling. The above protocol stack layers support the same functions for both the User and Control Planes. The NAS signaling stops at MME 101 level because the top-level protocols terminate in the MME.

When a Non-Access Stratum (NAS) signaling connection needs to be established between the UE 20 and the MME 101 routed via relay node 10, the UE 20 and the MME 101 shall enter the connected state. The NAS protocol/signaling occurs between the UE 20 and the MME 101 via relay node 10, thus supporting mobility management functionality as well as the user plane bearer activation, modification and deactivation.

Figure 2:
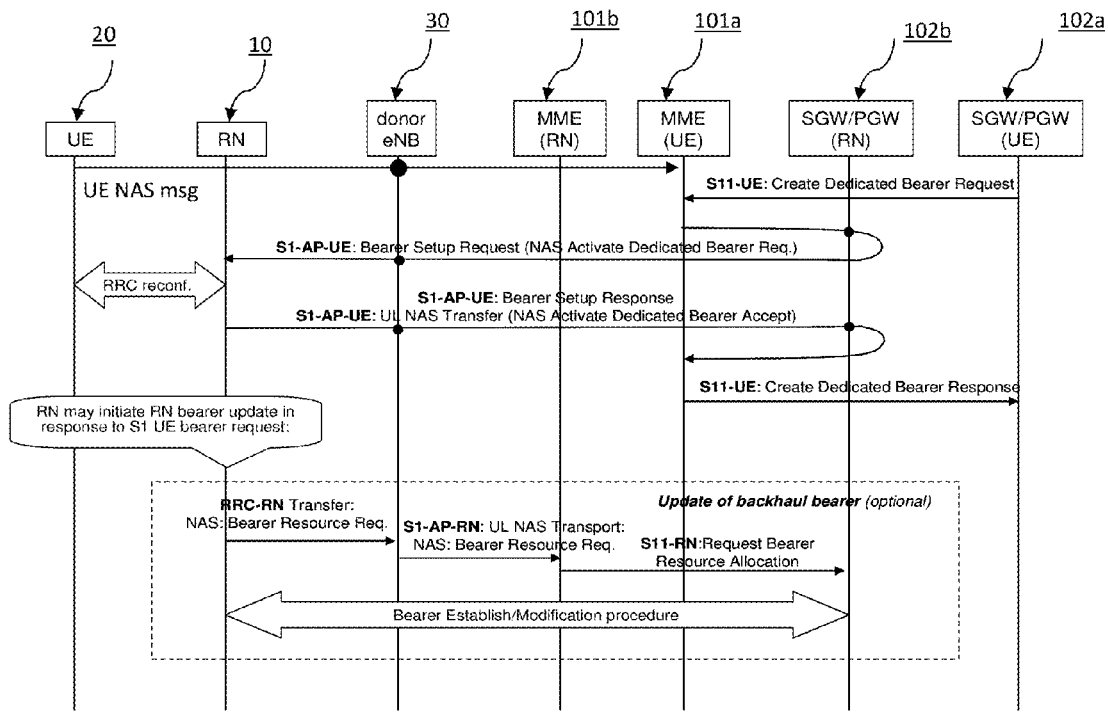
FIG. 2 is an illustration of existing bearer establishment procedure for user equipments (UE) and relay nodes (RN) as specified in 3GPP LTE (A) network architectures.

FIG. 2 shows the signaling message for bearer initiation procedure existing in 3GPP LTE specification. UE 20 sends an initial NAS message or service request to the MME_UE 101*a*, which is routed through RN 10 and Donor eNB 30. When a NAS layer in the UE has to send an initial NAS message denoted as 'UE NAS Msg' in FIG. 2, the UE first initiates the establishment of the Radio Resource Control (RRC) connection over the Uu interface. The RRC procedures are elaborated in 3GPP specification TS 36.331 available at www.3gpp.org. Following the establishment of the RRC connection over the Uu interface, the RN initiates the establishment of the RRC connection over the Un interface. The RRC connection establishment procedure over the Uu and Un interfaces are identical.

The Non-initial NAS message is a ciphered message directed to MME (UE) 101*a* and the RN 10 is transparent. The MME (UE) 101*a* understands the message and forwards it to the SGW/PGW (UE) 102*a* for checking the UE subscription data (which is to be obtained from HSS 108, FIG. 1). Then the SGW/PGW (UE) 102*a* authorizes MME (UE) 101*a* to create a dedicated bearer and sends the message over S11 interface (Interface between S/PGW and MME). On receiving the response, MME (UE) 101*a* sends bearer setup request to the UE 20 as an S1-AP message routed through RN 10. RN 10 understands this S1-AP message and initiates RRC configuration between UE 20 and RN 10. A bearer setup response is then sent by UE 20 to MME (UE) 101*a* routed via RN 10 and Donor eNB 30 as an S1-AP message. On receiving the response from UE 20, MME (UE) 101*a* establishes the bearers and sends the response to SGW/PGW (UE) 102*a*. This process establishes radio bearers to enable data flow from the SGW/PGW (UE) 102*a* to the UE 20.

After completion of this procedure, the RN 10 may send a NAS message seeking bearer-resource request to MME (RN) 101*b* through Donor eNB 30. MME (RN) 101*b* understands the message and provisions bearer resource allocation to RN 10. Upon receiving bearer resource allocation, RN 10 bearer establishment is completed. Radio resources for the relay node 10 are allocated so as to serve the already established UE's bearer requirements. The above process of initiating bearer establishment can also be initiated by EPC/Core Network. This happens both when the UE 20 is in the RRC_IDLE state and a message/data is to be transported to the UE 20 by the Core Network or when there is a change in existing bearer configuration to the UE 20 in the RRC_CONNECTED state. In this state, MME (UE) 101*a* initiates bearer-setup or modify procedure for the UE 20 at any point of time based on UE subscription and QoS requirements.

Thus in all the above instances of UE NAS Messages, whenever a UE 20 bearer is created or modified, the RN bearer, modify or create may be initiated subsequently by the RN 10. Thus additional messages are exchanged separately for the UE 20 and for the RN 10 to modify/create a new bearer. This either wastes or underutilizes the backhaul bandwidth. Further, there is delay in traffic flow.

Figure 3:
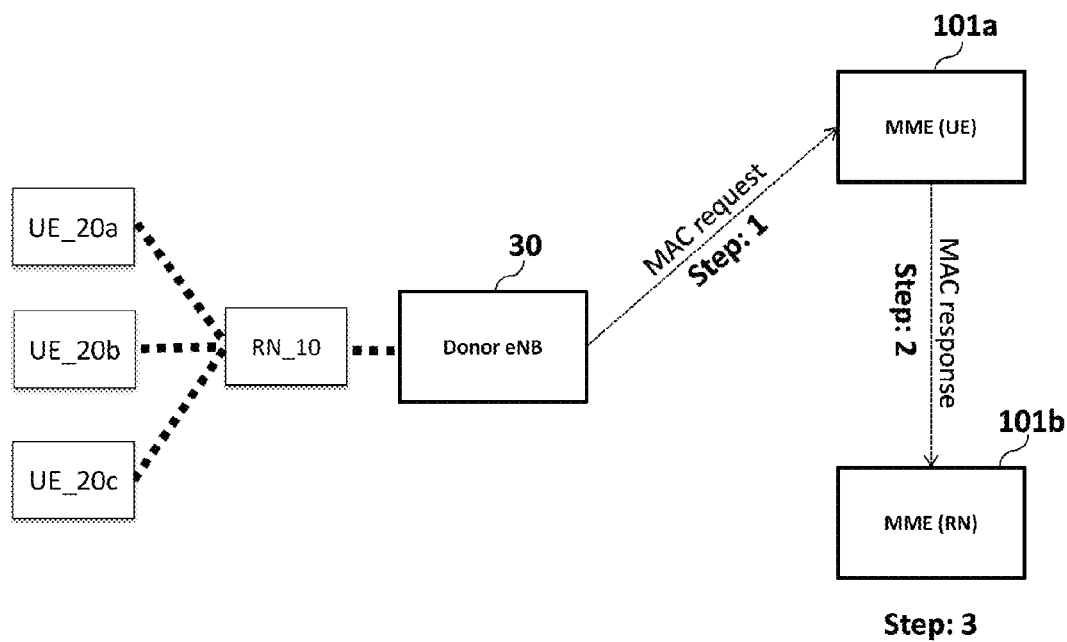
FIG. 3 represents a block diagram of network nodes performing MME Association and Consolidation functions in accordance with the embodiments of the invention.

FIG. 3 represents a block diagram of network nodes performing MME Association and Consolidation functions in accordance with the embodiments of the invention. Association includes all those UEs that are attached to or associated with a particular RN and Consolidation includes bringing together the UE context pertaining to that association.

Assuming that UE_20*a*, UE_20*b* and UE_20*c* via RN_10 are attached with Donor eNB 30. For the purposes of illustration, UEs 20*a* to 20*c* are shown attached with one relay node, but it is to be understood that UEs may be attached with one or more relay nodes in tandem. As an example, a bearer resource request of UE_20a, UE_20b and UE_20c reaches Donor eNB 30 routed via RN_10 Donor eNB 30 understands the received message as an UE bearer resource request. Donor eNB 30 is gnostic on MME Association Consolidation for managing bearers of UE and RN and based on MME identities present in Radio Resource Control (RRC) parameter, generates MME Association Consolidation (MAC) request message for MME (UE) 101a wherein, the MAC request essentially comprises of MME (RN) identity, UE identities and a MAC request to the MME (UE) 101a to consolidate and send all UE context information pertaining to UEs 20a to 20c and other information derived or associated with the UE context like Evolved Placket System (EPS) Mobility Management (EMM), Evolved Packet System (EPS) Session Management (ESM), IP address and Tunnel ID to MME (RN) 101b (Step 1).

The EPS Mobility Management (EMM) protocol provides procedures for the control of mobility when the UE uses the Evolved UMTS Terrestrial Radio Access Network (E-UTRAN). EPS Session Management (ESM) protocol provides procedures for the handling of EPS bearer contexts. Tunnel ID, in particular GPRS Tunneling Protocol (GTP) Tunnels are used between two nodes communicating over a GTP based interface, to separate traffic into different communication flows. A GTP tunnel is identified in each node with a Tunnel Endpoint ID (TEID), an Internet Protocol (IP) address and a User Datagram Protocol (UDP) port number. The EPS Mobility Management and EPS Session Management (ESM) are as per 3GPP LTE System Architecture Evolution (SAE).

MME (UE) 101a understands the received message to be a MAC request essentially comprising of MME Association Consolidation for managing bearers of UE and RN and then consolidates for the requested UE identities all the UE context information pertaining to UEs 20a to 20c along with other information derived or associated with the UE context like Evolved Placket System (EPS) Mobility Management (EMM), Evolved Packet System (EPS) Session Management (ESM), IP address and Tunnel ID and forwards to MME (RN) 101b over S10 interface as an MME Association Consolidation (MAC) response (Step 2). This makes all the UE context information along with other information derived or associated with the UE context like Evolved Packet System (EPS) Mobility Management (EMM), Evolved Packet System (EPS) Session Management (ESM), IP address and Tunnel ID pertaining to UEs 20a to 20c, available at MME (RN) 101b.

Thereafter MME (RN) 101b provisions the bearer resource request of UE_20a to UE_20c based on the received MAC response and also provisions the consequential bearer requirements of RN_10 The MME (RN) 101b identifies the required bearer resources of RN_10 and provisions appropriate bearer resources for RN 10_3. The embodied MME_RN 101b has an enhanced functionality that may enable consequential RN bearer (create or modify) requests to be addressed before UE_20a to UE_20c bearer setup. The provisioning of bearer resources by MME (RN) 101b may be a union of S1-AP message or sequential in any order. Subsequently any further bearer resource requests of UE_20a, UE_20b or UE_20c may be provisioned by the MME (RN) 101b based on the received MAC response along with simultaneous provisioning of consequential bearer requirements of RN_10 wherein, provisioning includes creating, updating, modifying and deleting bearers of UE and RN. It is to be noted that in case of UEs attached with relay nodes in tandem, MME (RN) provisions the consequential bearer requirements of all those relay nodes. This MME Association Consolidation (MAC) removes the bearer setup signaling loops of UE and RN thus saving considerable wireless bandwidth, signaling resource and setup time.

Figure 4:
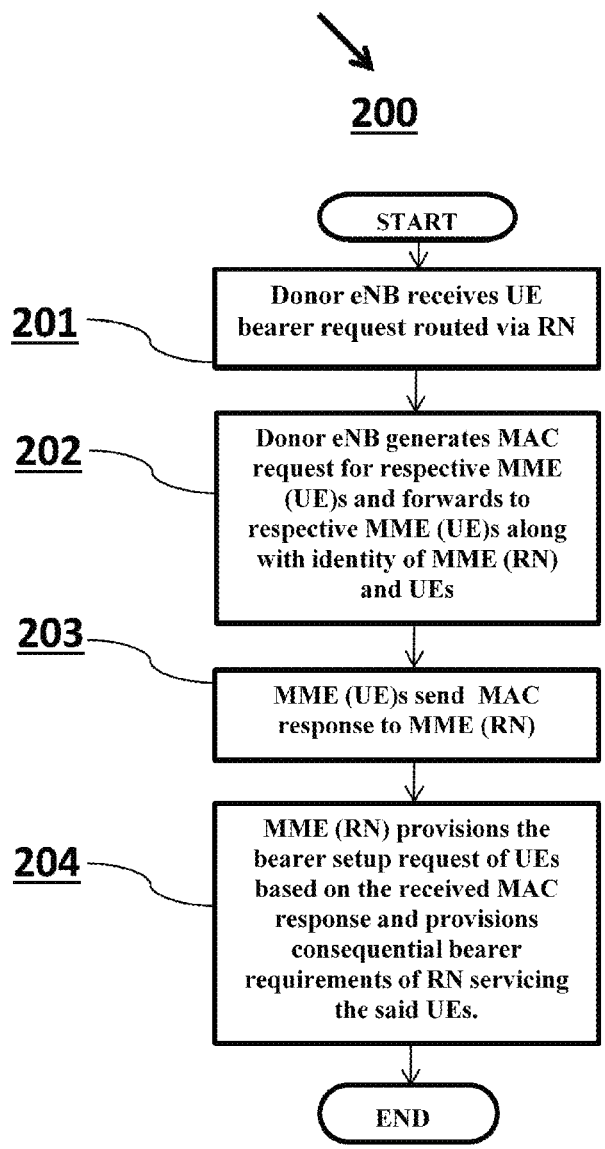
FIG. 4 is the flowchart of the functions performed by network nodes in accordance with the embodiments of the invention.

FIG. 4 is a flow chart diagram representing the functionality in accordance with an embodiment of the invention, which may be implemented in the scenario as explained with respect to FIG. 3. The embodied functionality of Donor eNB begins at 201 wherein, it receives UE bearer resource request routed through RN. At 202 Donor eNB/eNodeB understands the received UE bearer resource request message and generates MME Association Consolidation (MAC) request message comprising of MME (RN) identity and identity of UE or identities of UEs or UE along with a request to the MME (UE)s to consolidate and send to MME (RN) all UE context information pertaining to UEs managed by the said MME (UE)s and other information derived or associated with the UE context like Evolved Placket System (EPS) Mobility Management (EMM), Evolved Packet System (EPS) Session Management (ESM), IP address, Tunnel ID, and forwards to respective MME (UE)s. At 203, the MAC request message is received by the respective MME (UE)s. MME (UE)s understands the received MAC request message and then consolidates all the UE context information managed by it for the requested UE identities and forwards the consolidated UE Context information along with other information derived or associated with the UE context like Evolved Packet System (EPS) Mobility Management (EMM), Evolved Packet System (EPS) Session Management (ESM), IP address and Tunnel ID to MME (RN) as an MME Association Consolidation response message based on the MME (RN) identity received along with the received MAC request message.

On receiving the MAC request, at 204 MME (RN) provisions the bearer resource request of UEs based on the received MAC response and provisions consequential bearer requirements of the RN servicing the said UEs. The embodied MME (RN) has an enhanced functionality that may enable consequential RN bearer (create or modify) requests to be provisioned before UE bearer setup. The provisioning of bearer resources of MME (RN) may be a union of S1-AP message or sequential in any order. Thus MME (RN) becomes the consolidated Core Network entity capable of managing and provisioning the bearers of both UE and RN.

Another embodiment of the invention relates to the implementation of the above described various embodiments using hardware and software. Various embodiments of the invention may be implemented or performed using computing devices (processors). A computing device or processor may for e.g., be general purpose processors, digital signal processors (DSP), application specific integrated circuits (ASIC), field programmable gate arrays (FPGA) or other programmable logic devices, etc. The various embodiments of the invention may also be performed or embodied by a combination of these devices. Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments of the invention may individually or in arbitrary combination be subject matter to another invention. It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method for Mobility Management Entity (MME) Association Consolidation (MAC) for bearer management signaling for a user equipment coupled to a donor base stations (eNodeB) via a relay node, the method comprising of:
   receiving by the eNodeB, bearer resource request of the user equipment coupled to the relay node;
   generating a MAC request for a mobility management entity (MME) associated with the user equipment (MME UE) by the eNodeB based on identities of the user equipment and the relay node, wherein the MAC request comprises a MME associated with the relay node (MME RN) identity and the user equipment identity;
   sending the generated MAC request to the MME UE;
   generating, based on the MAC request, a MAC response for the MME RN, the MAC response comprises the identity of the user equipment received in the MAC request and context information comprising evolved packet system (EPS) mobility management (EMM), EPS session management (ESM), IP address, and tunnel identity;
   sending the MAC response to the MME RN; and
   wherein the MME RN is configured to provision a bearer setup request of the user equipment, based on the received MAC response, and provision a consequential bearer setup request of the relay node.

2. The method of claim 1, wherein generating the MAC request comprises requesting UE Context information of the user equipment.

3. The method of claim 1, wherein provisioning comprises creating, updating, modifying and deleting bearers of the user equipment and the relay node.

4. A network comprising:
   a base station, wherein the base station is configured to:
      receive a bearer resource request of a user equipment coupled to a relay node;
      generate a MAC request for a mobility management entity (MME) associated with the user equipment (MME UE) based on identities of the user equipment and the relay node, wherein the MAC request comprises a MME associated with the relay node (MME RN) identity and the user equipment identity; and
      send the generated MAC request to the MME UE;
   wherein the MME UE is configured to:
      generate, based on the MAC request, a MAC response for the MME RN, the MAC response comprises the identity of the user equipment received in the MAC request and context information comprising evolved packet system (EPS) mobility management (EMM), EPS session management (ESM), IP address, and tunnel identity;
      send the MAC response to the MME RN; and
   wherein the MME RN is configured to:
      provision a bearer setup request of the user equipment, based on the received MAC response; and
      provision a consequential bearer setup request of the relay node.

5. The network of claim 4, wherein the network is a wireless communication network.

6. The network of claim 4, wherein the user equipment is a wireless communication device.

7. A network comprising:
   a relay node, a base station, a mobility management entity (MME) associated with a user equipment (MME UE), and a MME associated with the relay node (MME RN),
   wherein the base station is configured to:
      receive a bearer resource request of a user equipment coupled to the relay node;
      generate a MAC request for a mobility management entity (MME) associated with the user equipment (MME UE) based on identities of the user equipment and the relay node, wherein the MAC request comprises the MME RN identity and a user equipment identity; and
      send the generated MAC request to the MME UE;
   wherein the MME UE is configured to:
      receive the MAC request;
      generate, based on the received MAC request, a MAC response for the MME RN, wherein the MAC response comprises the identity of the user equipment received in the MAC request and context information comprising evolved packet system (EPS) mobility management (EMM), EPS session management (ESM), IP address, and tunnel identity;
      send the MAC response to the MME RN; and
   wherein the MME RN is configured to:
      receive the MAC response;
      provision a bearer setup request of the user equipment, based on the received MAC response; and
      provision a consequential bearer setup request of the relay node.

8. The network of claim 7, wherein the network is a wireless communication network.

9. The network of claim 7, wherein the user equipment is a wireless communication device.

* * * * *